Dec. 19, 1933.                    J. C. KAPP                    1,940,091
                   RACK FOR CONFECTION AND FOOD CONTAINERS
                           Filed April 21, 1932
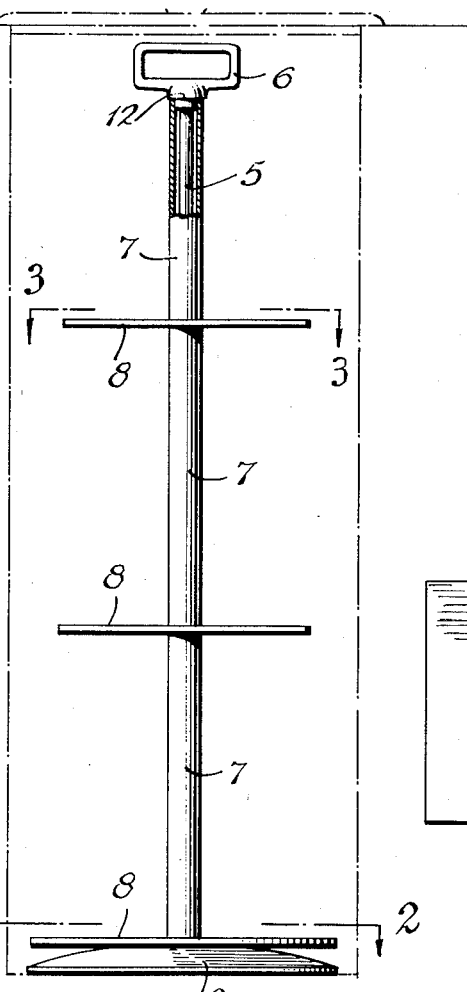
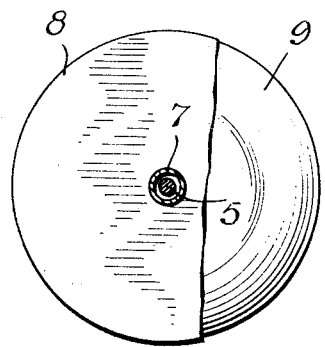
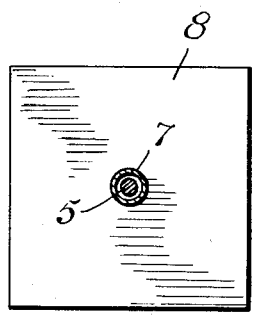
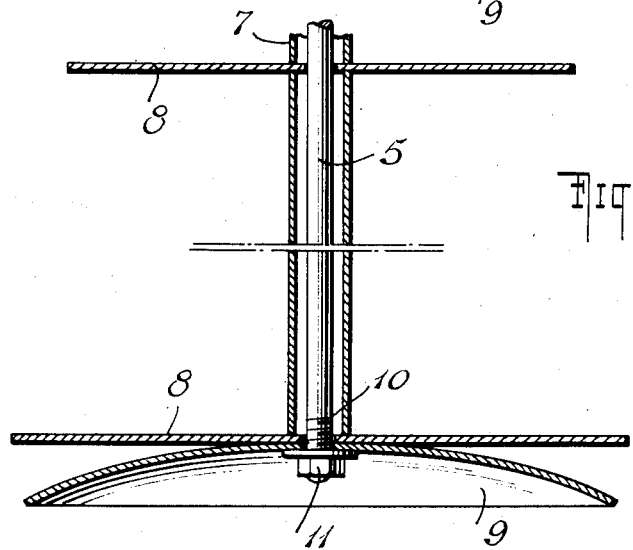
INVENTOR
JOHN C. KAPP
BY
Oscar A. Geier
ATTORNEY Patented Dec. 19, 1933

1,940,091

UNITED STATES PATENT OFFICE 1,940,091

RACK FOR CONFECTION AND FOOD CONTAINERS

John C. Kapp, Packanack Lake, N. J.

Application April 21, 1932. Serial No. 606,537

1 Claim. (Cl. 211—148)

This invention relates to improvements in apparatus employed to store confections and foods in a container and has particular reference to a rack adapted for insertion into and removable from said container.

An object of the invention is to provide an improved rack of simple and inexpensive construction which will facilitate handling and distribution of articles carried thereby.

The above and other objects will appear more clearly from the following detailed description when taken in connection with the accompanying drawing which illustrates a preferred embodiment of my inventive idea.

In the drawing:—

Figure 1 is an elevation, partly broken away and shown in section, of a rack constructed in accordance with the invention, the dotted lines indicating a container for receiving the rack.

Figure 2 is a section on the line 2—2 of Figure 1.

Figure 3 is a section on the line 3—3 of Figure 1, and

Figure 4 is an enlarged fragmentary vertical longitudinal section through the lower portion of the rack.

The rack of the present invention is especially designed for supporting articles of food and the like within a container such as might be used for refrigerating purposes and is constructed to permit of ready access to articles which may be located in the bottom of the container by merely lifting the rack therefrom.

As shown the rack comprises a standard consisting of a centrally located tie rod 5, the upper end of which terminates in a handle 6 adapted to be grasped when inserting the rack into a container or lifting the same therefrom. The standard further comprises a plurality of spacing sleeves 7 surrounding the tie rod 5 and having interposed between adjacent ends thereof a series of superposed shelves 8 in the form of flat plates. Three of said shelves are shown in Figure 1 but it will be understood that any convenient number may be employed. The two uppermost shelves are shown of rectangular formation while the lowermost one is circular. However, these shelves may have any desired configuration and are made to suitably support articles of confection or food thereon. With the tie rod extending through central openings in the various shelves and the spacing sleeves between each adjacent pair of said shelves abutting the same around said opening it will be obvious that the shelves will be maintained in fixed horizontal positions when the rack is supported vertically within the container.

The standard is provided with a base 9 in the form of a concavo-convex plate and extending through the center thereof is the screw-threaded lower end 10 of the tie rod. The lowermost shelf 8 rests upon the base and when the nut 11 is threaded upon the tie rod and tightened against the under side of the base it will be obvious that the various elements constituting the rack will be effectively secured together with the shelves clamped between the ends of the sleeves 7. This clamping action is accomplished by reason of the engagement of the upper end of the top sleeve 7 with a shoulder 12 formed upon the handle 6.

What is claimed is:

In a rigid sheet metal rack for supporting articles of food and the like, a standard comprising a cylindrical tie rod having a downwardly facing shoulder adjacent the upper end thereof provided with a depending nipple portion extending below said shoulder, a plurality of spaced superimposed resilient imperforate unflanged thin metal shelves provided with central openings of slightly larger diameter than said rod whereby said shelves are mounted and placed upon upon said rod, thin sheet metal spacing sleeves encircling said rod, the sheet metal of which is about of the same thickness as the sheet metal of the shelf and the internal diameter of which is substantially in excess of the diameter of the rod so that there will be a substantial anular spacing between each sleeve and said rod, the internal diameter of said sleeve also being substantially greater than the diameter of the central openings in said shelves, the uppermost sleeve abutting said shoulder and telescoping with said nipple and the remaining ends of said sleeves abutting the central portions of the shelves around said central openings, a thin resilient sheet metal base for said standard of substantially the same thickness as said shelves provided with a central opening of about the same diameter as the central openings of said shelves whereby it may be mounted on the lower end of said tie rod, the lower end of said tie rod being threaded and receiving a plate washer and a nut, said nut upon being drawn up upon the lower end of said tie rod pressing said washer against said sheet metal base and clamping said shelves between said sleeves and the uppermost sleeve against said shoulder, said base consisting of an upwardly domed and downwardly concaved member so that when the rack is assembled and said nut is drawn up upon the lower end of said rod the resilient base and the resilient shelves will be placed in compression whereby a high degree of rigidity will be obtained.

JOHN C. KAPP.